(No Model.) 2 Sheets—Sheet 2.

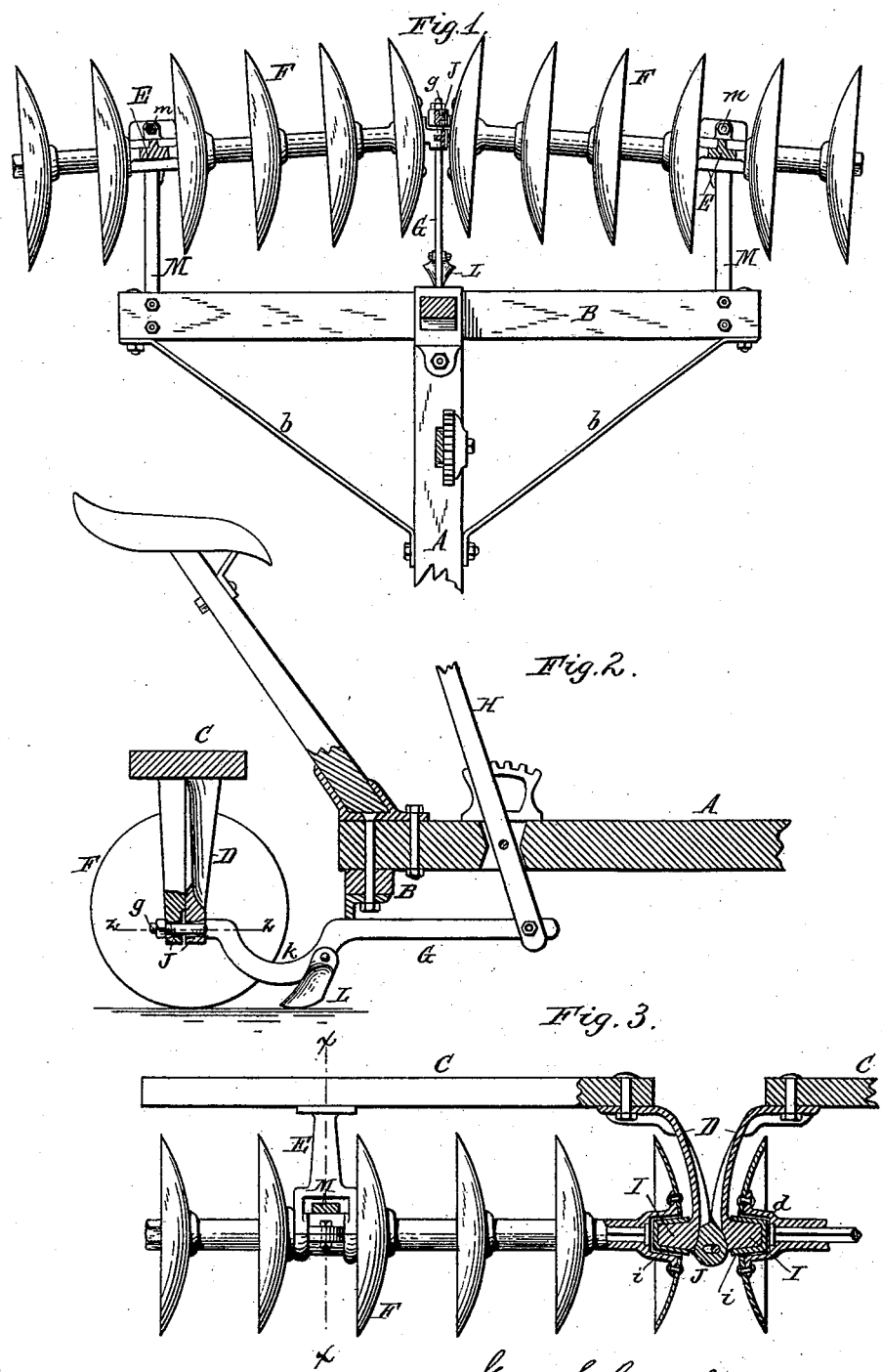

G. G. CROWLEY.
DISK HARROW.

No. 449,871. Patented Apr. 7, 1891.

Witnesses:
Jacob Nusenblatt
Emil Neuhart

George G. Crowley Inventor.
By Wilhelm Bonner
Attorneys.

United States Patent Office.

GEORGE G. CROWLEY, OF BATAVIA, NEW YORK, ASSIGNOR TO THE JOHNSTON HARVESTER COMPANY, OF SAME PLACE.

DISK HARROW.

SPECIFICATION forming part of Letters Patent No. 449,871, dated April 7, 1891.

Application filed June 16, 1890. Serial No. 355,579. (No model.)

*To all whom it may concern:*

Be it known that I, GEORGE G. CROWLEY, a citizen of the United States, residing at Batavia, in the county of Genesee and State of New York, have invented a new and useful Improvement in Disk Harrows, of which the following is a specification.

This invention relates to that class of disk harrows in which the two gang-frames are flexibly connected at their inner ends, so that the inward thrust of the gangs is taken up and the gangs are prevented from spreading apart, while they have the requisite play to rise and fall in accommodating themselves to the irregularities of the ground and to be adjusted angularly with reference to the line of draft.

The object of my invention is to produce a simple and durable construction of this kind which permits the ready adjustment of the gangs and brings the inner ends of the gangs closely together.

Figure 4:
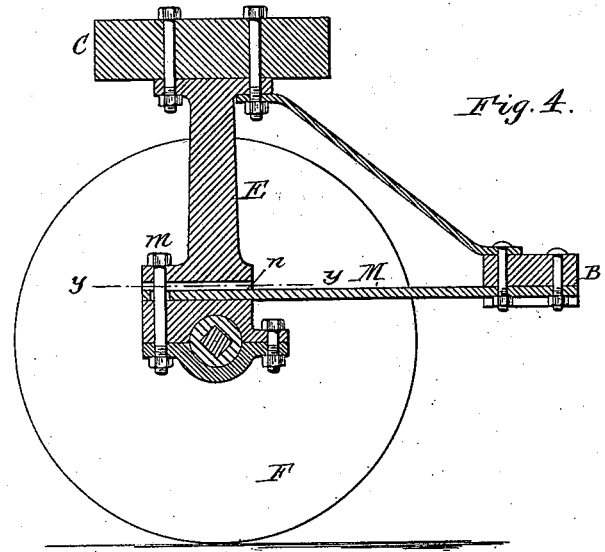
Figure 5:
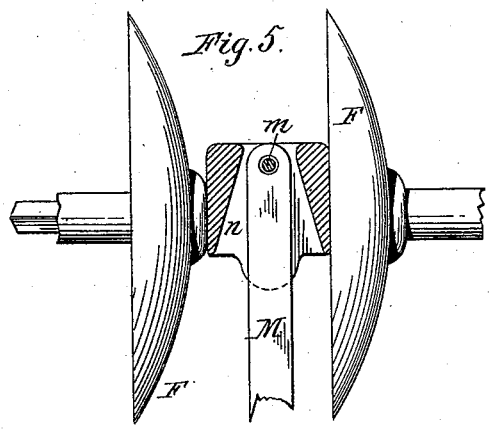
Figure 6:
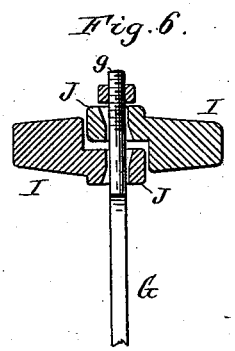
Figure 8:
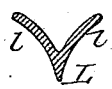
Figure 7:
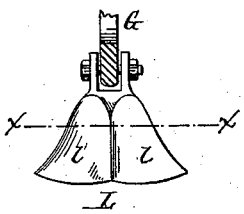
Figure 9:

In the accompanying drawings, consisting of two sheets, Figure 1 is a sectional top plan view of a disk harrow provided with my improvements. Fig. 2 is a longitudinal sectional elevation of the same. Fig. 3 is a fragmentary front elevation of the gangs, partly in section. Fig. 4 is a vertical longitudinal section in line $x\ x$, Fig. 3, on an enlarged scale. Fig. 5 is a horizontal section in line $y\ y$, Fig. 4. Fig. 6 is a horizontal section in line $z\ z$, Fig. 2, on an enlarged scale. Fig. 7 is a front elevation of the auxiliary plow or shovel attached to the central draft-rod. Fig. 8 is a horizontal section in line $x\ x$, Fig. 7. Fig. 9 is a side elevation of said plow or shovel.

Like letters of reference refer to like parts in the several figures.

A represents the pole, and B the rear cross-bar of the draft-frame, having its ends connected with the pole by the usual braces $b$.

C C represent the gang-planks; D D, the inner bearings and E E the outer bearings secured thereto, and F the disks.

G represents the central draft-rod attached with its front end to the adjusting-lever H, which is mounted on the pole in the usual manner.

The inner bearings D D are provided on the outer sides of their lower ends with studs I, which enter cavities in the thimbles $d$ at the inner ends of the disk gangs and on which the gangs turn. Cup-shaped bushings $i$ are preferably interposed between the thimbles and the studs to reduce the wear. The innermost disk of each gang is preferably riveted directly to the flange of the innermost thimble in order to bring the disk as closely to the innermost bearing as possible and reduce the width of the strip of land which remains uncultivated between the two gangs. The inner bearings D are provided at the inner sides of their lower ends with interlocking perforated lugs J, one of which is arranged in front of the other. The draft-rod G is provided at its rear end with a longitudinal bolt $g$, which passes through both lugs J and couples the two bearings together. The openings in the lugs are made flaring to permit the angle of the gangs to be changed. The outer end of each gang is free to rise and fall by turning on this longitudinal coupling-bolt in passing over the irregularities of the ground. The inward thrust of the gangs is taken up by the lower portions of the bearings D abutting against each other, and the outward thrust is taken up by the longitudinal coupling-bolt. The rear portion of the central draft-rod G is bent or cranked longitudinally, as shown at $k$, to pass underneath the adjacent front portions of the innermost disks.

L represents an auxiliary plow or shovel pivoted to the draft-rod in front of the innermost disks and adapted to cultivate the narrow strip of land which remains untouched by the disks between the disk gangs. This plow is provided with two rearwardly-diverging shares $l$, whereby the soil is divided and thrown outwardly. When the plow is not required, the draft-rod can be reversed, so that its bent portion passes over the adjacent front portions of the innermost disks, in which position the draft-rod is less liable to catch against obstructions.

M represents the outer draft-rods, which are secured with their front ends to the cross-bar B of the main frame and pivoted with their rear ends to the outer bearings E of the disk gangs by vertical bolts $m$. The latter are preferably located in rear of the gang-axle to reduce the movement to a minimum which the inner ends of the gangs have toward and from each other in adjusting their angle. Each of the outer bearings E is provided above the gang-axle with a horizontal recess or opening $n$, in which the rear portion of the outer draft-rod is arranged, and these openings are flared forwardly to permit the bearings to clear the draft-rod in the various positions to which the gangs are adjusted.

I claim as my invention—

1. The combination, with the gang-planks provided at their inner ends with bearings having lugs arranged one in front of the other and disk gangs journaled on said bearings, of a draft-rod provided at its rear end with a longitudinal coupling-bolt which passes through said lugs, substantially as set forth.

2. The combination, with the gang-planks and the gangs of disks, of depending bearings secured to the inner ends of the planks and provided on their outer sides with studs on which the disks turn and on their inner sides with perforated lugs arranged one behind the other, and a longitudinal coupling-bolt passing through said lugs, substantially as set forth.

3. The combination, with the disk-gangs provided at their inner ends with interlocking bearings and a draft-rod whereby said bearings are coupled together, of an auxiliary plow or shovel attached to said draft-rod in front of the disks, substantially as set forth.

4. The combination, with the gang-planks and the gangs of disks, of inner bearings, a central adjustable draft-rod connected with said bearings, outer draft-rods secured with their front ends to the main frame, and outer bearings provided with forwardly-flaring openings in which the rear ends of the outer draft-rods are pivotally secured, substantially as set forth.

Witness my hand this 2d day of June, 1890.

GEORGE G. CROWLEY.

Witnesses:
ALBERT J. GLASS,
E. J. MOCKFORD.